Dec. 2, 1930.                G. BROWN ET AL                1,783,825

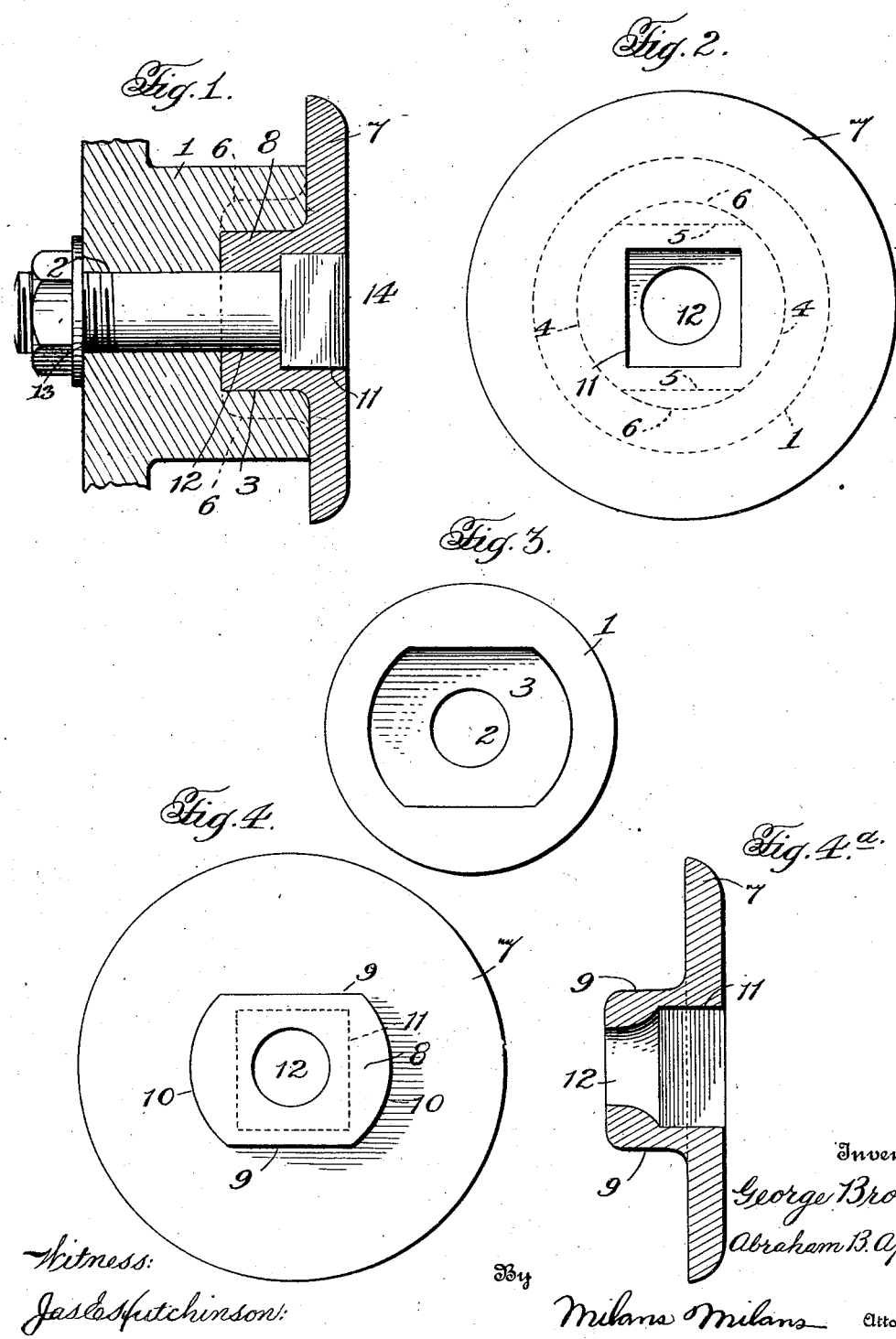

CRANK PIN AND COLLAR

Filed May 7, 1924           2 Sheets-Sheet 2

Inventors.

George Brown and Abraham B. Appler,

Witness:
Jas E Hutchinson

By
Milans & Milans
Attorneys.

Patented Dec. 2, 1930

1,783,825

UNITED STATES PATENT OFFICE

GEORGE BROWN, OF ONEONTA, AND ABRAHAM B. APPLER, OF ALBANY, NEW YORK

CRANK PIN AND COLLAR

Application filed May 7, 1924. Serial No. 711,734.

Our invention relates to new and useful improvements in crank pins and collars therefor, the principal object of the invention residing in the provision of a crank pin having an irregularly shaped recess in the end thereof and a collar having an irregularly shaped projection adapted to be received in the recess, the shape of the projection and recess preventing rotation of the collar relative to the pin.

With the above and other objects in view, which will appear as the description proceeds, our invention consists in the novel details of construction, and arrangement of parts, described in the following specification and illustrated in the accompanying drawings, and while we have illustrated and described the preferred embodiments of the invention as they now appear to us it will be understood that such changes may be made as will fall within the scope of the appended claims.

In the drawings:

Fig. 1 is a longitudinal vertical section through a portion of a crank pin and a collar, showing the collar in position relative to the pin.

Fig. 2 is an end view of Fig. 1 showing an outer face view of the collar.

Fig. 3 is an end view of the crank pin.

Fig. 4 is an inner face view of the collar.

Fig. 4a is a vertical section through the collar illustrated in Fig. 4.

Figure 5:
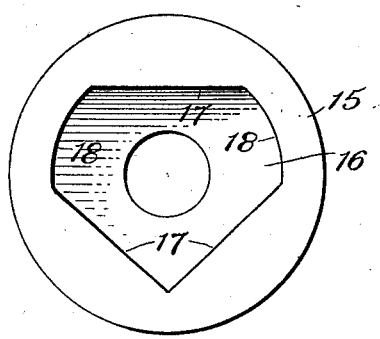
Fig. 5 is an end view showing a slightly modified form of crank pin.

The conventional method of preventing rotation of a collar relative to a crank pin or the like has been to use a circular dowel inserted between the crank pin and collar, the crank pin having an annular recess into which was inserted an annular projection on the collar. This method has been found objectionable in that the dowels would easily become worn or broken and in time allow the collar to rotate relative to the crank pin. With our formation the recess formed in the end of the crank pin is of irregular formation and the projection on the collar is of a similar shape thereby preventing at all times rotation of the collar relative to the crank pin.

In the drawings 1 indicates a crank pin having a longitudinally extending bore 2 therethrough and a recess 3 formed in one end thereof. As is quite clearly shown in the drawings the bore 2 extends into the recess 3 and the recess 3 is of irregular formation having the curved walls 4 and straight walls 5 said straight walls 5 being preferably formed by welding or otherwise securing projections or castings within a normally circular recess, the projections or castings being indicated at 6. In the case of a new crank pin the castings or projections may be formed at the same time that the pin is formed but in the case of old crank pins which normally have circular openings in the end thereof the projections or castings will be secured or formed in the recess in the manner as described in our Patent No. 1,679,349 dated August 7, 1928.

The collar, preferably circular in shape and of a diameter greater than that of the crank pin, is shown at 7 and is provided on its inner face with the projection 8 which has the flattened portions 9 and the rounded portion 10 whereby the shape of the projection corresponds to the shape of the recess 3 formed in the end of the crank pin. The collar 7 is provided on its outer face with the opening 11 which is preferably square in shape and leading from the inner end of the opening, through the projection 8, is an opening 12, which when the collar is in position relative to the pin aligns with the bore 2 formed through the crank pin. It will be seen that when the projection 8 of the collar 7 is within the recess 3 of the pin that the collar is held against rotation relative to the pin. For preventing movement of the collar away from the end of the pin we provide the bolt 13 which has the square head 14. The bolt passes through the opening 12 in the collar and the bore 2 in the pin with its head 14 received in the square opening 11 formed in the outer face of the collar. The inner end of the bolt 13 will preferably be threaded to receive a nut as shown.

Figure 6:
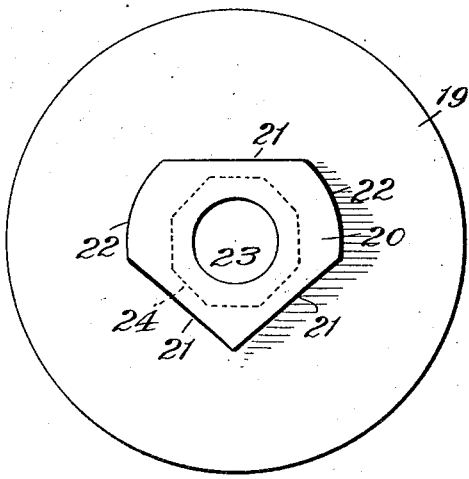
Fig. 6 is an inner face view of a collar adapted to be used with the pin shown in Fig. 5.

In Figs 5 and 6 we have shown a pin having a slightly different shaped recess in the end and a collar having a projection of a shape corresponding to that of the recess. In this form the pin is shown at 15 and has the recess 16 formed in its end. The recess is formed with flat portions 17 and the opposed curved portions 18. The collar is indicated at 19 and has the projection 20 on its inner face, said projection having the flattened portions 21 and the opposed curved portions 22 whereby the projection is of a shape to conform to the shape of the recess 16 in the pin and to be received therein. An opening 23 extends through the collar and projection and communicates with an enlarged recess 24 formed in the outer face of the collar, said recess 24 being preferably octagon in shape as shown in dotted lines in Fig. 6 of the drawings.

Figure 7:
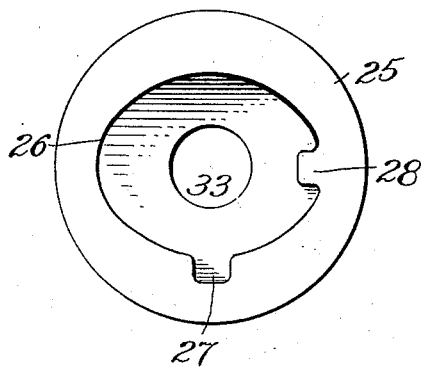
Fig. 7 is an end view of a still further modified form of crank pin.
Figure 8:
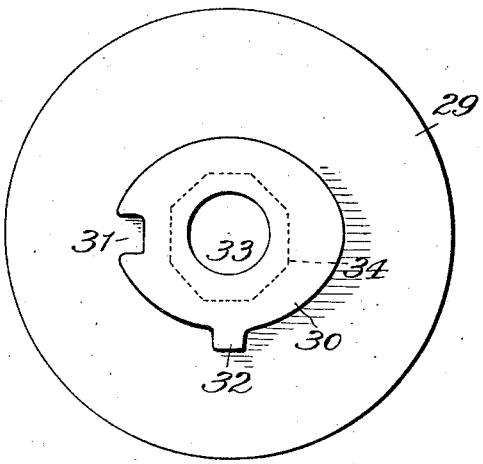
Fig. 8 is an inner face view of a collar adapted to be used with the form of pin disclosed in Fig. 7.

In Figs. 7 and 8 we have shown a still further modified form of pin and collar or more particularly a different shape of recess in the end of the pin and projection on the face of the collar. The crank pin is shown at 25 and its end is formed with the substantially oval shaped recess 26, a notch 27 being formed adjacent one edge of the recess and a projection 28 extending inwardly therefrom. The collar is shown at 29 and has the projection 30 extending from the inner face thereof, this projection being substantially oval shaped to correspond with the recess formed in the end of the crank pin. A notch 31 is formed in one side of the projection 30 and a projection 32 is formed on the lower edge. When the collar is in position relative to the pin the projection 30 will be received in the recess 26, the projection 32 in the notch 27 and the projection 28 of the pin will be received in the notch 31 formed in the end of the projection 30. An opening 33 extends through the collar 29 and the projection 30 and communicates with a recess 34 formed in the outer face of the collar as shown by dotted lines in Fig. 8. This recess 34 is preferably octagon in shape although it will be understood that we do not desire to be limited to any particular shape thereof.

From the above it will be seen that we have provided novel means for connecting a collar to a crank pin so that it is prevented from rotating relative thereto and from moving away from the end of the pin. Our idea is of such a character that either old or new pins may be used and, if desired, old collars. As has been previously stated crank pins now in use are formed with a circular recess in the end thereof and collars are formed with a circular projection on one face thereof. In order to make the circular recess of irregular shape we secure therein a projection or projections by welding or the like. If a collar is to be used, normally having a circular projection, the said projection may be made of irregular shape by filing or otherwise removing portions thereof so that the projection will be of a shape to correspond with the shape of the recess formed in the end of the pin. With new pins or collars the same will be formed with a recess and projection respectively of the desired shape. In describing the form of pin and collar disclosed in Figs. 5 and 6 we have stated that the recess in the pin will be formed with flat or straight portions but we wish it understood that if the pin is not originally formed with such portions that in the case of an old pin the straight or flattened surfaces may be provided by welding or otherwise securing a casting or projection within the recess.

While we have described our invention as adapted for crank pins and crank pin collars we wish it understood that the same principle might be applied to any machine parts subject to thrust or wear.

Having fully described my invention what we claim as new and desire to secure by Letters Patent is:

1. In combination with a crank pin having a recess in the end thereof of a shape other than circular, of a collar of greater diameter than the pin adapted to be engaged with the end thereof, said collar having a recess formed in its outer face and a projection formed on its inner face to be received in the recess of the pin, the projection being of a shape corresponding to the shape of the recess to prevent rotation of the collar relative to the pin, and removable means passing longitudinally through the pin and through the collar to prevent longitudinal separation of the collar from the pin, said removable means having an enlarged head to be received in the recess formed in the outer face of the collar.

2. In combination with a crank pin having a recess in the end thereof of a shape other than circular, of a collar of greater diameter than the pin adapted to be engaged with the end thereof, said collar having an irregularly shaped recess formed in its outer face and a projection formed on its inner face to be received in the recess of the pin and of a shape corresponding therewith to prevent rotation of the collar relative to the pin, and removable means passing longitudinally through the pin and through the collar to prevent longitudinal separation of the collar from the pin, said removable means including an irregularly shaped head adapted to be received in the irregularly shaped recess formed in the outer face of the collar.

In testimony whereof we hereunto affix our signatures.

GEORGE BROWN.
ABRAHAM B. APPLER.